United States Patent [19]
Troeh

[11] 3,992,927
[45] Nov. 23, 1976

[54] SOIL MOVEMENT DETECTION APPARATUS

[75] Inventor: Frederick R. Troeh, Ames, Iowa

[73] Assignee: Iowa State University Research Foundation, Inc., Ames, Iowa

[22] Filed: Aug. 11, 1975

[21] Appl. No.: 603,600

[52] U.S. Cl. .................................. 73/88 E; 33/1 H
[51] Int. Cl.². ......................................... G01N 33/22
[58] Field of Search ........... 33/1 H, 125 B; 73/88 E, 73/151

[56] References Cited
UNITED STATES PATENTS

| | | | |
|---|---|---|---|
| 3,323,216 | 6/1967 | Ublacker | 73/151 |
| 3,404,460 | 10/1968 | Livingston | 33/1 |
| 3,568,326 | 3/1971 | Dodds | 33/125 |
| 3,885,423 | 5/1975 | Schuermann | 73/88 |

FOREIGN PATENTS OR APPLICATIONS

| | | | |
|---|---|---|---|
| 1,249,625 | 10/1971 | United Kingdom | 73/151 |

Primary Examiner—Herbert Goldstein
Attorney, Agent, or Firm—Zarley, McKee, Thomte & Voorhees

[57] ABSTRACT

An apparatus for detecting soil movement is disclosed generally comprising an elongated housing which is inserted downwardly into a bore hole drilled in the soil. The housing generally has a rectangular configuration and is disposed within the hole so that the cross-sectional longitudinal axis is parallel to the direction of soil movement and so that the length of the housing is disposed substantially perpendicular to the directon of soil movement. The housing is provided with an anchor means at the lower end thereof which anchors the housing in stable soil to prevent movement of the housing itself. A plurality of vertically spaced soil movement detectors are provided along the length of the housing and include outwardly extending wings. A plurality of indicators are provided at the upper end of the housing and are operatively connected to the detectors by linkage means so that movement of the detectors by soil movement cause the indicators to indicate the amount of soil movement as detected by that particular detector.

4 Claims, 4 Drawing Figures

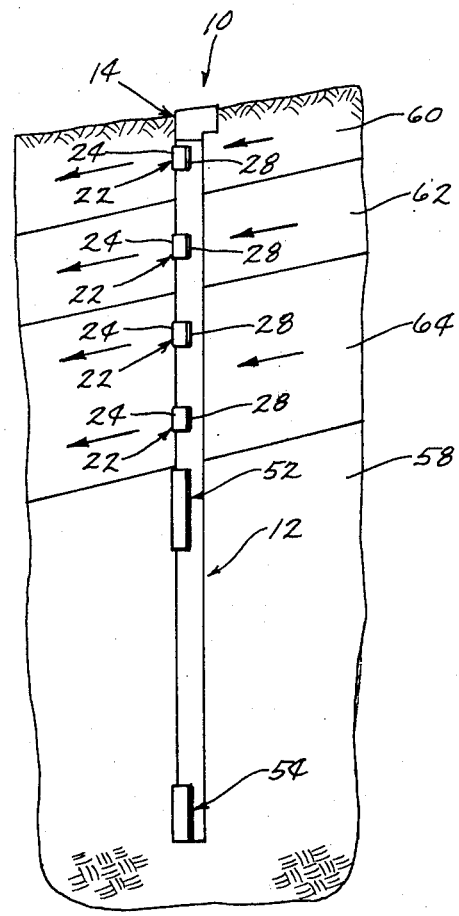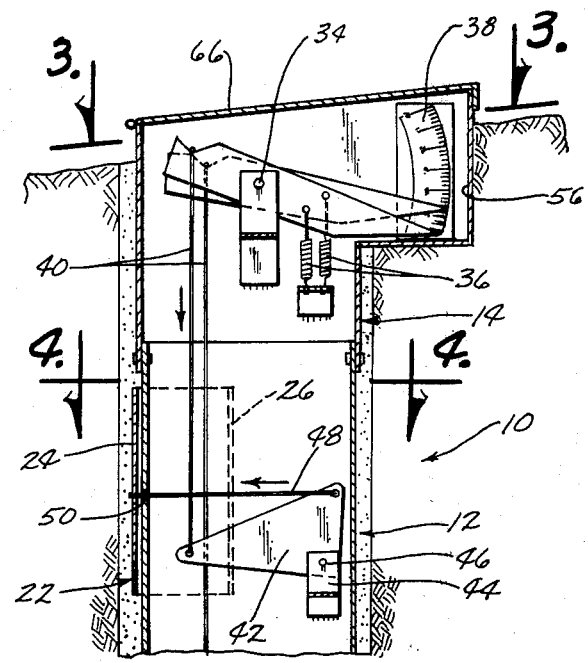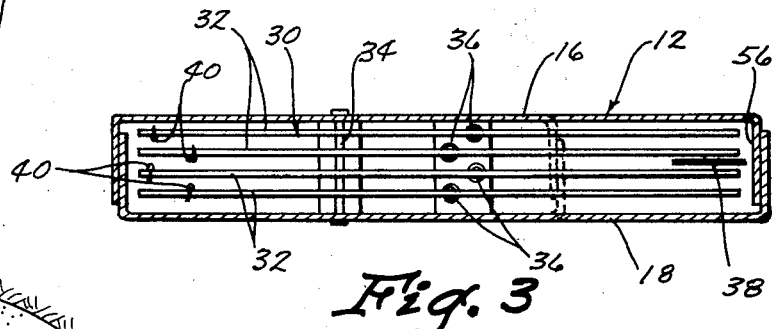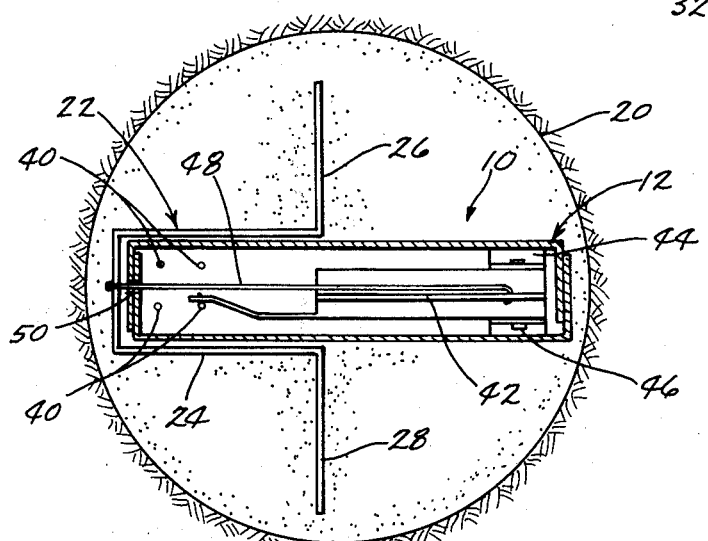

SOIL MOVEMENT DETECTION APPARATUS

BACKGROUND OF THE INVENTION

Soil creep is the very slow movement of soil down a slope. The movement is so slow and broad in scope that it does not normally reveal itself by scars on the landscape, nor does it disrupt the formation of soil horizons. Soil creep differs from erosion in that creep involves a large mass of soil (probably the entire solum) moving en masse for a short distance, whereas erosion takes a smaller amount of soil and removes it from the area.

The slowness of soil creep makes it easy to ignore or overlook. The creep is therefore seldom mentioned and rarely measured. Nevertheless, its effect can be significant because they are cumulative over long periods. The persistence of soil movement makes it significant to sciences dealing with soils or landscapes. One centimeter of soil movement per year would add up to a meter in a century. Some soils may have moved several meters while man has been using them and possibly several kilometers during their total existence.

Two main difficulties must be overcome in measuring the rate and amount of soil creep. One difficulty is posed by the slow rate of movement. Either long times must be considered, or very precise measurements must be made. The second difficulty is the need for stable reference points from which the soil movement can be measured.

Some workers have measured the rate of movement of stones on the soil surface rather than that of the soil itself. One previous worker drove metal stakes through the soil into bedrock to serve as stationary reference points. Marked stones were placed on the soil surface and measured relative to the metal stakes. The stones moved downslope at rates ranging from a few millimeters per year on a 3° slope to almost 70 millimeters per year on a 40° slope. It was recognized that the stones moved faster than the soil because some stones were caught in cracks and moved more slowly than the others. This difference in rate of movement is at least partially dependent on the relative densities of the stones and the soil.

Other scientists have recognized the importance of density effects on rates of movement and prepared hollow steel cylinders and weighted them to match the soil density. The cylinders were buried at various depths in the soil and observation tubes were placed above them. The positions of the cylinders relative to fixed positions in the underlying chalk bedrock were measured with theodolites. This method required multiple measurements and a complex mathematical analysis to evaluate the movement. It was found that the movement was spasmodic and parallel to the steepest slope direction.

Scientists have also attempted to measure soil creep by burying paraffin rods in auger holes. The lower parts of the paraffin rods were embedded in compact glacial till and the upper parts were in the soil solum. The rods were dug up after a time, and their shapes indicated the amount and depth of movement that had occurred. A further device used to measure soil creep was a metal probe strip with several strain gages built into it. The strips were buried in the same manner as the paraffin rods. Wires from the strain gages led to the soil surface where an electric meter was attached when readings were to be taken.

Therefore, it is the principal object of the invention to provide an improved apparatus for detecting soil movement. A still further object of the invention is to provide an apparatus for detecting soil movement which measures soil creep simply and accurately.

A still further object of the invention is to provide an apparatus for detecting soil movement which is capable of measuring the rates of movement on lesser slope gradients than most of the prior art devices and methods.

A still further object of the invention is to provide an apparatus for detecting soil movement which eliminates the complex mathematical analysis which some of the previous apparatuses and methods have required.

A still further object of the invention is to provide an apparatus for detecting soil movement which does not interfere with normal tillage of the ground after the apparatus has been used to detect the soil movement.

A still further object of the invention is to provide an apparatus for detecting soil movement which is economical to manufacture, durable in use and refined in appearance.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a vertical sectional view illustrating the apparatus installed in the soil:

FIG. 2 is a vertical sectional view taken through the upper portion of the apparatus:

FIG. 3 is an enlarged sectional view seen on lines 3—3 of FIG. 2; and

FIG. 4 is an enlarged sectional view seen on lines 4—4 of FIG. 2.

DESCRIPTION OF THE PREFERRED EMBODIMENT

The apparatus of this invention is referred to generally by the reference numeral 10 and generally comprises an elongated rectangular housing 12 having an extension 14 provided on the upper end thereof that will be described in more detail hereinafter. Preferably, the inventions of housing 12 are ½ inch × 3 inches × 8 feet. Housing 12 may be formed by joining a pair of channel members 16 and 18 as illustrated in FIG. 3. The apparatus is inserted downwardly into a hole drilled into the soil having a 3½ inch diameter and referred to generally by the reference numeral 20.

A plurality of soil movement detectors 22 are provided on the housing 12 as illustrated in the drawings. Each of the detectors 22 generally comprises a U-shaped portion 24 which embraces the downslope side of the housing and having wings or flanges 26 and 28 extending outwardly from the ends thereof as illustrated in the drawings.

A plurality of indicators 30 are pivotally mounted within the upper end of extension 14 and generally comprises a pointer 32 which is pivotally secured to the extension 14 by pin 34. Pointer 32 is normally held in the position illustrated in FIG. 2 by a spring 36 which yieldably prevents pivotal movement thereof. The numeral 38 refers to a scale which is provided in extension 14 to enable the scientist or the like to determine the amount of soil movement as recorded by the pointer 32 as will be described in more detail hereinafter.

A wire 40 is secured to each of the pointers 34 and extends downwardly therefrom within housing 12 as seen in the drawings. The lower end of each of the wires 40 is connected to a lever 42 which is pivotally connected to a bracket 44 at 46. A wire 48 is pivotally connected to each of the levers 42 and extends therefrom outwardly through an opening 50 formed in housing 14 and is connected to one of the indicators 22 as illustrated in FIG. 4. A pair of vertically spaced anchors 52 and 54 are rigidly secured to the housing 14 at the lower end thereof as seen in FIG. 1 and have the same cross-sectional configuration as the indicators 22.

The apparatus is installed and operated as follows. The hole 20 is drilled in the soil and preferably has a 3½ inch diameter. The hole is drilled to a 9 foot depth and is enlarged at the upper end at 56 to accomodate the extension 14. It should be noted that two important limitations must be considered in selecting the sites for the installation of the apparatus. First, it must be possible to dig a hole through the soil into stable material therebelow referred to generally by the reference numeral 58 in FIG. 1. The layers of unstable soil are referred to generally by the reference numerals 60, 62 and 64 in FIG. 1. Secondly, the site must remain undisturbed by tillage equipment and other traffic until the measurements are terminated and the top part or extension 14 of the structure has been removed.

The apparatus 10 is inserted downwardly into the opening 20 and it is recommended that the wires 40 simply be secured to the upper end of the housing rather than the pointers during installation so that the detectors will remain in position during the installation. The apparatus is inserted into the opening 20 so that the upper end is positioned relative to the ground surface illustrated in FIG. 2 and so that the wings 26 and 28 on each of the detectors are perpendicular to the slope of the soil and so that the housing is substantially vertically disposed.

After the apparatus has been lowered into the hole 20, the hole is backfilled with the fill material being tamped in tightly to anchor the device and to make the moveable parts move with the soil. Tamping sticks may be left in the bottom half of the hole as part of the backfill and to help anchor the device. The anchors 52 and 54 are positioned in the stable soil 58 and serve to prevent movement of the housing 14 relative to the soil.

The upper ends of the wires 40 are then secured to their respective pointers and the pointers are adjusted precisely to the zero mark on the scale 38 by bending the wires accordingly. Cover 66 on extension 14 is then closed and the backfilling completed. It is recommended that a protective piece of heavy sheet metal be installed over the apparatus to complete the installation.

After a period of time has elapsed, the readings are taken by removing the protective piece of sheet metal and by opening the cover 66. If soil movement has occurred adjacent any of the detectors 22 the detector will have moved downslope or to the left as viewed in FIGS. 1, 2 and 4. Movement of the detectors relative to the housing causes level 42 to pivot in a counterclockwise direction as viewed in FIG. 2 which causes the wire 40 to move downwardly thereby pivoting the pointer 32 in a counterclockwise direction. The amount of movement of the detector is indicated by the pointer on the scale 38. Thus, it is possible to determine the amount of soil creep or soil movement experienced by each of the detectors 22 to enable the scientist to study the same. After the necessary readings have been obtained, the extension 14 is removed from the upper end of housing 12 and the remaining apparatus is simply covered with soil to enable the ground to be cultivated or the like. The inexpensive construction of the apparatus dictates that the apparatus be abandoned within the ground after the leads have been taken rather than attempt to remove the same for future use.

Thus it can be seen that a simple but accurate apparatus has been provided which enables the movement of soil to be detected. Thus it can be seen that the apparatus accomplishes at least all of the stated objectives.

I claim:

1. An apparatus for detecting soil movement, comprising,
    an elongated housing for insertion downwardly into the soil and being substantially vertically disposed, said housing having its length disposed substantially perpendicular to the direction of soil movement,
    said housing having a rectangular cross-section with its major axis being disposed substantially parallel to the direction of anticipated soil movement, said housing having upslope and downslope ends and opposite sides,
    a plurality of vertically spaced soil movement detectors positioned on the exterior of said housing,
    each of said detectors comprising a U-shaped portion embracing a portion of each side of said housing and said downslope end of said housing, each of said detectors having a pair of flat laterally extending portions extending outwardly from said U-shaped portion and being disposed substantially transverse to the direction of anticipated soil movement, each of said flat laterally extending portions dwelling in a substantially vertical plane,
    a plurality of indicators at the upper end of said housing, and
    mechanical linkage means connecting each of said soil movement detectors to one of said indicators whereby movement of the detector relative to the said housing will be indicated.

2. The apparatus of claim 1 wherein an anchor means is rigidly secured to said housing adjacent the lower end thereof for anchoring the lower end of said housing in stable material, said anchor means including a pair of oppositely extending wings on opposite sides of said housing, said wings being substantially parallel to said laterally extending portions of said detectors.

3. The apparatus of claim 1 wherein each of said linkage means comprises a lever horizontally pivotally mounted within said housing, the pivotal axis of said lever being disposed transversely with respect to the said major axis of said housing, said lever dwelling in a plane parallel to said housing sides, a first link connecting said detector to said lever whereby movement of said detector relative to said housing causes said lever to pivotally move about its pivotal connection, a second link connecting said lever to one of said indicators whereby pivotal movement of said lever causes said indicator to move, and a scale provided adjacent said indicators, each of said indicators including a pointer registering with said scale, said second links being pivotally connected to said pointers.

4. The apparatus of claim 1 wherein the upper end of said housing is positioned below ground level, and a removable housing extension provided on the upper end of said housing, said extension having a lower end removably connected to the upper end of said housing and having an upper end positioned adjacent ground level, and a cover means provided at the upper end of said extension, said indicators being positioned within said extension.

\* \* \* \* \*